COLOR TELEVISION RECEIVER WITH POWER LAW CHROMA AMPLIFIER

Filed Dec. 5, 1955

INVENTOR.
Ove E Petersen
BY Mueller & Aichele
Attys.

United States Patent Office 2,914,605

Patented Nov. 24, 1959

2,914,605

COLOR TELEVISION RECEIVER WITH POWER LAW CHROMA AMPLIFIER

Ove E. Petersen, Glen Ellyn, Ill., assignor to Motorola, Inc., Chicago, Ill., a corporation of Illinois Application December 5, 1955, Serial No. 550,896

5 Claims. (Cl. 178—5.4)

Figures 1, 2:
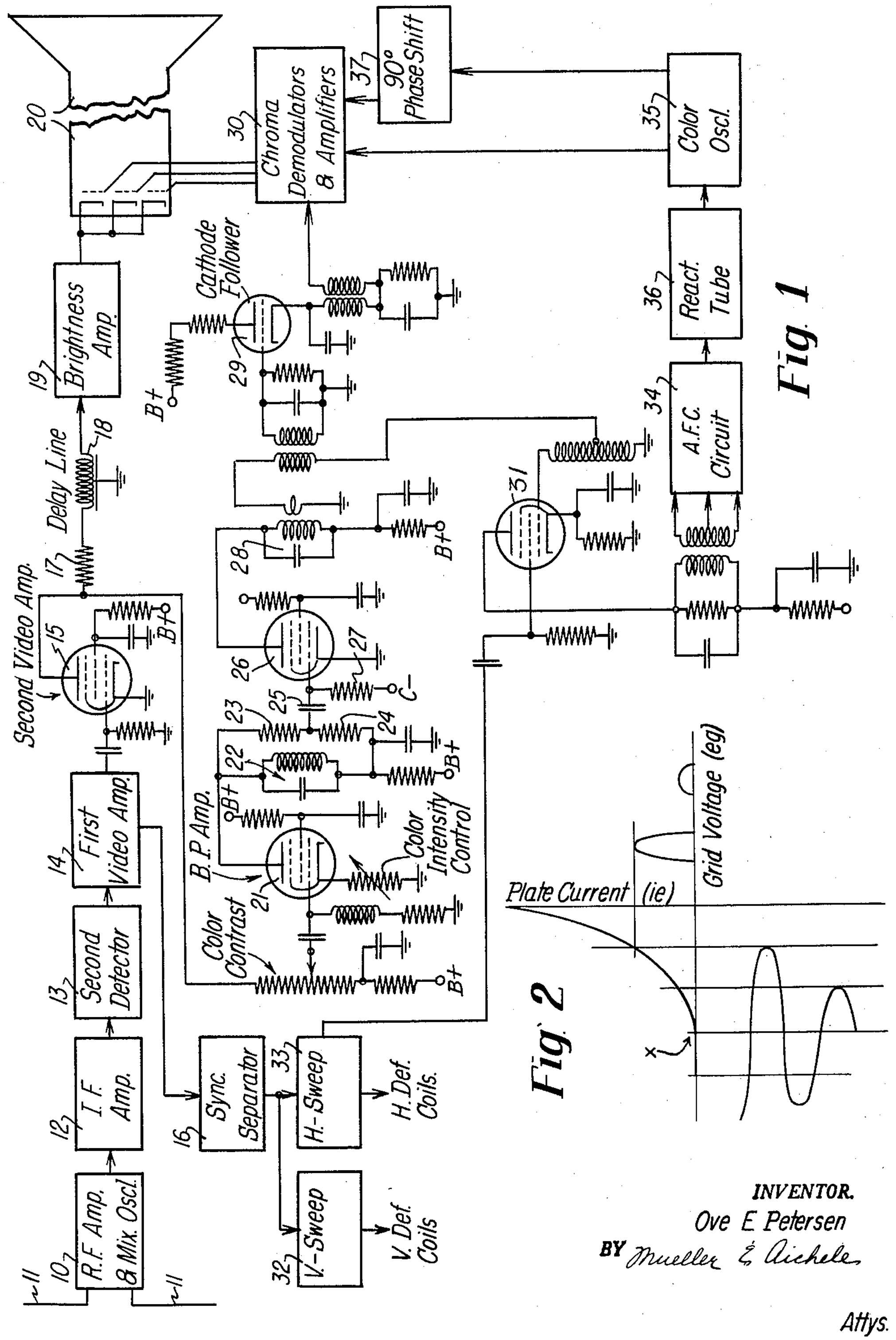

The present invention relates to color television and more particularly to an improved color television receiver for utilizing the standard color television signal.

The color television signal as presently standardized includes a main carrier which is amplitude modulated with brightness or luminence information, and the signal also includes a chroma subcarrier which is amplitude modulated on the main carrier. The chroma subcarrier is, in turn, amplitude modulated by the blue and red color-difference signals in quadrature phase relation. Therefore, the amplitude of the chroma subcarrier tends to increase as the transmitted picture tends towards the saturated colors. Expressed differently, the strong, saturated colors in the picture reproduced by the color television receiver are represented by maximum amplitude levels of the chroma subcarrier.

There is a preference in most observers for the saturated colors to be reproduced with a high degree of brilliance even though the color saturation ratios in the actual reproduction are artificial as compared with the original scene. In the prior art color television receivers, when the manual color intensity control was turned up to give the desired artificial brilliance of the saturated colors, the lighter mixed colors tended to become oversaturated and contaminated. This condition arose even though the saturation ratios between the various colors were properly controlled in the received signal, and simply because of the desire for excessive brilliance by the observer of the saturated colors. Therefore, when the observer adjusted the prior art receiver to obtain the degree of brilliance in the reds, blues and greens that he desired, he often produced an undesired oversaturation of the weaker mixed colors which produced an "off-color" effect for these latter colors which was particularly noticeable with flesh tones.

It is an object of the present invention to provide an improved color television receiver for utilizing the present day standardized color television signal and which is constructed to exaggerate the brillance of the strong, saturated colors so that a desired emphasis of these colors can be achieved without contaminating the other color tones in the reproduced picture.

A feature of the invention is the provision of an amplifier in the chroma channel of the receiver whose gain varies with signal amplitude so that the higher amplitude modulations of the chroma subcarrier resulting from the saturated colors are amplified to a greater extent than the lower color modulations, thereby to achieve the desired brilliance and over-emphasize the strong colors without adversely oversaturating and contaminating the weaker colors.

The above and other features of the invention which are believed to be new are particularly set forth in the claims. The invention itself, however, together with further objects and advantages thereof, may best be understood by reference to the following description when taken in conjunction with the accompanying drawing in which:

Fig. 1 is a circuit diagram, partly schematic, of a color television receiver incorporating the present invention; and Fig. 2 is a representation of certain characteristic curves of a component of the combination of the present invention.

As previously noted, the invention is applicable to a color television receiver constructed to utilize the present day color television signal, and which signal includes brightness components and an amplitude modulated chroma subcarrier component. The receiver includes circuit means for receiving and detecting the color television signal, a color image reproducing device, and a brightness channel coupled to the circuit means for translating the brightness component of the color television signal to the reproducing device. The invention includes the combination of a band-pass filter coupled to the circuit means for selecting the modulated chroma subcarrier, an amplifier coupled to the filter for amplifying the modulated chroma subcarrier and having a gain varying with the amplitude of the subcarrier, and chroma demodulator means coupled to the amplifier for demodulating the chroma subcarrier and for supplying the resulting color information to the color image reproducing device. By this means the color television signal is reproduced with the colors represented by the higher modulation level of the chroma subcarrier being emphasized.

Reference will now be made to Figs. 1 and 2 for a more complete understanding of the invention. The color television receiver of Fig. 1 includes the usual radio frequency amplifier and mixer oscillator stages 10, with the input terminals of the radio frequency amplifier being coupled to a suitable antenna and with the output terminals of the mixer oscillator being coupled through an intermediate frequency amplifier 12 to the second detector 13 of the receiver. The second detector is connected to the first video amplifier 14 which, in turn, is coupled to a second video amplifier including an electron discharge device 15 and to a synchronizing signal separator 16.

The anode of discharge device 15 is connected through a resistor 17 and a delay line 18 to a brightness amplifier 19, and the output terminal of the brightness amplifier is connected to the three cathodes of a tri-gun cathode-ray color image reproducer 20. The units 17, 18 and 19 constitute the brightness or luminance channel of the receiver, and this channel translates the luminance (Y) components of the received color television signal to the cathodes of the reproducer in a manner to be described.

The anode of device 15 is also coupled to a band-pass amplifier including an electron discharge device 21. The anode of device 21 is connected to the positive terminal B+ of a source of unidirectional potential through a usual band-pass circuit including a tuned network 22, which circuit renders the amplifier selective to the chroma subcarrier of the received color television signal. The tuned network 22 is shunted by a pair of series voltage-divider resistors 23, 24, and the common junction of these resistors is coupled through a capacitor 25 to the control electrode of an electron discharge device 26, the control electrode being returned through a resistor 27 to a negative biasing source C−. The anode of device 26 is connected to the positive terminal B+ through an anode circuit including a resonant network 28 tuned to the frequency of the chroma subcarrier. The resonant network 28 is coupled through a usual coupling circuit to the cathode follower drive 29 for the chroma demodulators and amplifier 30, and the resonant network is also coupled to a keyed burst amplifier discharge device 31.

The synchronizing signal separator is connected to the vertical sweep system 32 and to the horizontal sweep system 33 of the receiver, and these sweep systems in turn are connected respectively to the vertical deflection coils and to the horizontal deflection coils (not shown)

of reproducer 20. Horizontal sweep system 33 is also coupled to the discharge device 31 so that the amplifier may be keyed at the proper intervals to select the chroma synchronizing bursts. The anode of device 31 is coupled to a usual automatic frequency control circuit 34 which controls the color oscillator 35 through a reactance tube circuit 36. The color oscillator supplies, in conjunction with a quadrature phase shift network 37, a pair of phase quadrature reference signals for the chroma demodulator 30.

As is well known, the present day color television signal is constituted by a main carrier that is amplitude modulated with luminance (Y) components. The main carrier is also modulated by a chroma subcarrier which, in turn, is amplitude modulated by the red and blue color difference signals in phase quadrature relation. The color television signal is received and detected in the usual manner by the stages 11—15 of the receiver, and the detected signal appears as a composite video signal in amplifier form at the output of the second video amplifier device 15. The detected luminance signal or brightness component are translated by the brightness channel 17, 18 and 19 of the receiver to the cathodes of the image reproducer 20. The amplitude modulated chroma subcarrier, on the other hand, is selected by the band-pass amplifier of device 21 and appears in amplified form across network 22. This signal is coupled to the control grid of device 26 through capacitor 25, and device 26 is chosen to have a power-law plate current-grid voltage characteristic as shown in Fig. 2. This device may conveniently be of the type presently designated as the 12BY7. The control grid of device 26 is returned to the negative terminal B— so that the device may be operated essentially at its cutout point X in Fig. 2. This causes the device to operate essentially in class B, and plate current flows in response only to the positive half cycles of the amplitude modulated chroma subcarrier impressed on its control grid. The characteristic curve of this device is such that the device has a power-law gain characteristic, so that the higher amplitude portion of the chroma subcarrier produces an increasing gain in the device. The device, therefore, operates effectively as an "expander" for the signal impressed thereon. The half-wave current pulses in device 26 are re-formed into sine waves by the tuned circuit 28 so that the chroma subcarrier is reconstituted in its original form, but with the higher amplitude portions thereof exaggerated or expanded as compared with its lower amplitude modulation. This reconstituted chroma subcarrier is then supplied to the chroma demodulators wherein it is detected, and the three color difference signals are derived with the pure strong signals in each instance being exaggerated for the desired effect as discussed previously herein.

The present invention provides, therefore, a relatively simple means for deriving improved and more desirable color reproduction effects in the reproduced image, by creating an artificial ratio between the saturation levels of the strong colors as compared with the weaker colors.

I claim:

1. In a color television receiver for utilizing a color television signal which includes brightness components and which further includes a modulated chroma subcarrier component the amiplitude of which represents color saturation, said receiver including circuit means for receiving and detecting the color television signal, a color image reproducing device, and a brightness channel coupled to said circuit means for translating the brightness components of the color television signal to the reproducing device; the combination of a band-pass filter coupled to said circuit means for selecting the modulated chroma subcarrier, an amplifier coupled to said filter for amplifying the modulated chroma subcarrier, said amplifier having a nonlinear gain characteristic varying with the instantaneous amplitude of the signal amplified thereby so that portions of the chroma subcarrier representing more saturated colors are amplified to a greater extent than portions representing less saturated colors, and chroma demodulator means coupled to said amplifier for demodulating the chroma subcarrier and for supplying the resulting color information to the color image reproducing device with more saturated colors represented thereby accentuated with respect to less saturated colors.

2. A color television receiver for utilizing a color television signal which includes brightness components and which further includes a modulated chroma subcarrier component the amplitude of which represents color saturation, said receiver including in combination circuit means for receiving and detecting the color television signal, a band-pass filter coupled to said circuit means for selecting the modulated chroma subcarrier, an amplifier coupled to said filter for amplifying the modulated chroma subcarrier and having a gain varying directly with the instantaneous amplitude of the signal amplified thereby so that color saturation represented by the higher amplitude components of the chroma subcarrier are amplified more than other amplitude components thereof, and chroma demodulator means coupled to said amplifier for demodulating and utilizing the chroma subcarrier.

3. A color television receiver for utilizing a color television signal which includes brightness components and which further includes a modulated chroma subcarrier component the amplitude of which represents color saturation and further characteristics of which represent hue information, said receiver including in combination, circuit means for receiving and detecting the color television signal, a band-pass filter coupled to said circuit means for selecting the modulated chroma subcarrier, power-law amplifier means coupled to said filter for amplifying the higher amplitude portions of said modulated chroma subcarrier to a greater extent than the lower amplitude portions thereof to accentuate the saturation of more saturated colors represented by the subcarrier, and chroma demodulator and utilization means coupled to said amplifier for demodulating and using the chroma subcarrier.

4. In a color television receiver for utilizing a color television signal which includes brightness components and which further includes a modulated chroma subcarrier component the amplitude of which represents color saturation and a further characteristic of which represents hue information, said receiver including circuit means for receiving and detecting the color television signal, a cathode-ray color image reproducing device, and a brightness channel coupled to said circuit means for translating the brightness components of the color television signal to the reproducing device; the combination of a band-pass amplifier coupled to said circuit means for selecting and amplifying the modulated chroma subcarrier, a second amplifier having a power-law gain characteristic coupled to said band pass amplifier for amplifying the modulated chroma subcarrier to an extent varying with the amplitude of the subcarrier to accentuate the saturation of more saturated colors represented thereby, and chroma demodulator means coupled to said amplifier for demodulating and utilizing the chroma subcarrier.

5. In a color television receiver for utilizing a color television signal which includes brightness components and which further includes a modulated chroma subcarrier component, said receiver including circuit means for receiving and detecting the color television signal, a cathode-ray image reproducing device, and a brightness channel coupled to said circuit means for translating the brightness components of the color television signal to the reproducing device; the combination of a band-pass amplifier coupled to said circuit means for selecting and amplifying the modulated chroma subcarrier, a second amplifier including an electron discharge device with a power-law gain characteristic and having an anode and a cathode and a control electrode, means connecting said cathode to a point of reference potential, an input circuit coupling said control electrode to said band-pass amplifier and including biasing means for biasing said control electrode negatively with respect to said cathode to cause said device to be operated essentially at its cut-off point so that only the positive half-waves of the chroma subcarrier appear at said anode, an output circuit connected to said anode and including a tuned circuit for restoring the full wave form of the chroma subcarrier, and chroma demodulator means coupled to said tuned circuit for demodulating the chroma subcarrier.

References Cited in the file of this patent

UNITED STATES PATENTS

| | | |
|---|---|---|
| 2,757,229 | Larky | July 31, 1956 |
| 2,798,900 | Bradley | July 9, 1957 |

FOREIGN PATENTS

| | | |
|---|---|---|
| 708,088 | Great Britain | Apr. 28, 1954 |
| 723,698 | Great Britain | Feb. 9, 1955 |